United States Patent

Shiga et al.

[11] Patent Number: 5,580,082
[45] Date of Patent: Dec. 3, 1996

[54] STEERING WHEEL PAD ATTACHMENT STRUCTURE

[75] Inventors: Ichizou Shiga, Iwakura; Yuji Kuriyama, Seki; Katsunobu Sakane; Muneharu Sasajima, both of Ichinomiya; Kouzi Sakurai, Inazawa, all of Japan

[73] Assignee: Toyoda Gosei Co., Ltd., Japan

[21] Appl. No.: 484,331

[22] Filed: Jun. 7, 1995

[30] Foreign Application Priority Data

Jul. 7, 1994 [JP] Japan .................................. 6-156178
Oct. 26, 1994 [JP] Japan .................................. 6-262810

[51] Int. Cl.$^6$ ................................................ B60R 21/20
[52] U.S. Cl. ........................................ 280/728.3; 280/731
[58] Field of Search ........................... 280/728.3, 728.2, 280/731, 732, 728.1, 730.1

[56] References Cited

U.S. PATENT DOCUMENTS 5,074,584 12/1991 Jarboe ................................ 280/728.2
5,167,427 12/1992 Baba ................................... 280/728.3
5,201,541 4/1993 Jones et al. ........................ 280/728.2
5,312,129 5/1994 Ogawa ............................... 280/728.2
5,427,407 6/1995 Yokote ............................... 280/728.2
5,445,409 8/1995 Abramczyk et al. ............... 280/728.3

FOREIGN PATENT DOCUMENTS

4414761 11/1994 Germany ........................... 280/728.2
63-189962 12/1988 Japan .

Primary Examiner—Eric D. Culbreth
Assistant Examiner—Peter C. English
Attorney, Agent, or Firm—Cushman Darby & Cushman, L.L.P.

[57] ABSTRACT

A plurality of claws are formed, by, for example, cutting or stamping, on side walls of an air bag holder and extend toward pad side walls and downwardly. Holes are formed in the pad side walls. With the pad side walls being located outside of the side walls of the bag holder, claws are fitted in the holes. Engaging projections on the distal ends of the claws which project from the pad side walls are engaged in engaging recesses below the holes or are bent and crimped in a direction in which the side walls extend.

5 Claims, 8 Drawing Sheets

STEERING WHEEL PAD ATTACHMENT STRUCTURE

BACKGROUND OF THE INVENTION

The present invention relates to a steering wheel pad attachment structure and, more particularly, to a steering wheel pad attachment structure in which side walls of the pad are connected to side walls of a bag holder of an air bag device.

Figure 12:
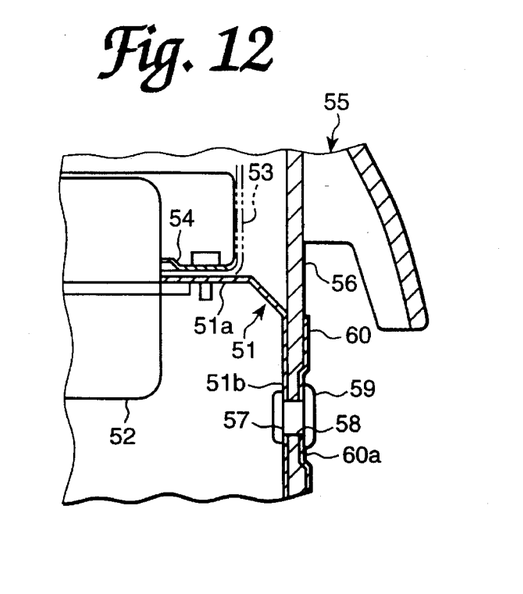
FIG. 12 is a partial cross-sectional view showing a pad attachment structure in a prior art device.

A conventional steering wheel pad of an air bag device has, for example, the following attachment structure. As shown in FIG. 12, an air bag holder 51 comprises a main body 51a having an opening formed in the center, and side walls 51b extending downwardly, as viewed in the figure. As a whole, the bag holder 51 has, for example, a box-like shape. The bag holder 51 is secured on bosses (not shown), and an inflator 52 is provided in the above-mentioned central opening. Also, an air bag 53 made of cloth and a ring retainer 54 are attached to the upper surface of the bag holder 51. Further, a steering wheel pad 55 (hereinafter referred to simply as "pad") is provided over the bag holder 51.

The pad 55 comprises a pad main body (not shown) which covers an upper portion of the bag holder 51, and pad side walls 56 which extend substantially perpendicularly (downwardly, as viewed in the figure) from a periphery of the pad main body toward the bag holder 51. Holes 57 and 58 are formed in the side walls 51b of the air bag holder 51 and the pad side walls 56, respectively. The holes 57 and 58 are aligned with each other in such a manner that the pad side walls 56 abut against the side walls 51b of the air bag holder 51. Side walls 51b and 56 are fastened to one another with rivets 59. The pad 55 is thus fixedly attached to the air bag holder 51.

When the air bag 53 is inflated, the pad side walls 56 undergo large outward stresses. Accordingly, the pad side walls 56 can break or tear at the holes 58 due to the stresses. Therefore, support plates 60 having recesses 60a are conventionally provided on the outer surface of the pad side walls 56. The side walls 51b and 56 are then fastened with rivets 59. With such a structure, even if the pad side walls 56 experience outward stresses, tearing of the pad side walls 56 can be prevented by frictional force between pad side walls 56 and the support plates 60, and by engagement between the recesses 60a and the pad side walls 56.

Figure 13:
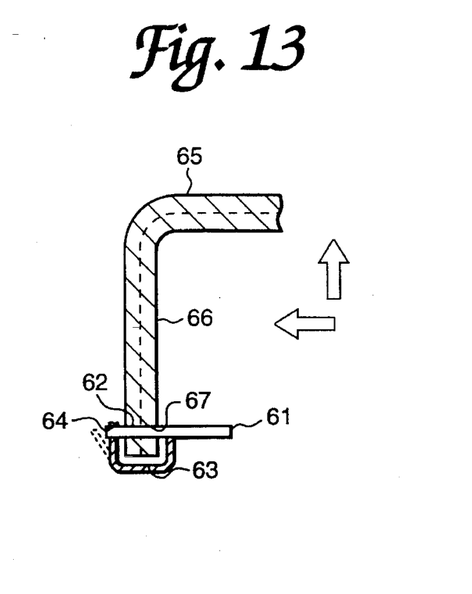
FIG. 13 is a partial cross-sectional view showing a pad attachment structure in another prior art device.

In the conventional technique described above, however, various kinds of additional parts, such as rivets 59 and support plates 60, are required to attach the pad 55, thereby increasing the costs for such attachment. In order to solve such cost problems, for example, a structure as disclosed in Japanese Utility Model Unexamined Publication No. 63-189962 is known. In this structure, as shown in FIG. 13, a number of claws 62 are provided at the outer periphery of an air bag holder (base plate) 61. Also, curved engaging tongues 63, which have a substantial U-shape, are provided adjacent to the outer peripheral portion of the air bag holder 61. Further, holes 64 are formed in distal end portions of the engaging tongues 63 at positions corresponding to the claws 62. When a pad 65 is attached, holes 67 in pad side walls 66 receive the claws 62, and the engaging tongues 63 are bent inwardly. Then, the holes 64 in the distal end portions of the engaging tongues 63 are engaged with the claws 62. With this engagement, the pad 65 is fixed on the bag holder 61.

Moreover, with such an attachment structure, additional members, such as rivets and support plates mentioned above, are unnecessary, so manufacturing costs can be reduced. Furthermore, when the claws 62 are particularly dimensioned, outwardly directed inflation-related stresses can be dispersed even if such stresses are exerted on the pad 65. Consequently, breaking or tearing of the pad side walls 66 can be prevented. However, if such stresses are exerted laterally (to the left in the figure), claws 62 may come disengaged from the holes 67, making it impossible to maintain the engagement therebetween. In other words, the pad 65 undergoes outward and lateral stresses when the air bag is inflated, and the pad 65 may be detached from the bag holder 61 because of such stresses.

SUMMARY OF THE INVENTION

The present invention can resolve the above-described problems. It is an object of the present invention to avoid cost increases caused by the need for additional parts, such as rivets and support plates. Another object is to prevent a steering wheel pad from being detached from an air bag holder when the air bag is inflated.

In order to achieve the above objects, according to the present invention, a steering wheel pad attachment structure includes an air bag holder having a main body and side walls extending substantially perpendicularly from around an edge of the main body. The air bag holder is secured, by at least one portion thereof, to a steering wheel, and has an air bag attached thereto. A steering wheel pad includes a pad main body covering the air bag holder, and pad side walls extending from the pad main body toward the air bag holder. The steering wheel pad side walls are located outside of the side walls of the air bag holder and are engagable with the side walls of the air bag holder. The side walls of the air bag holder are provide with claws which extend outwardly toward lower portions of the pad side walls. The distal ends of the claws include inwardly projecting engaging projections. Holes are formed in the pad side walls, and engaging recesses or apertures are formed in the outer side of the pad side walls at below the holes. The claws on the air bag holder are received in the holes in the pad side walls, and the engaging projections on the distal ends of the claw, which project from the pad side wall, are bent to be engaged in the engaging recesses or apertures.

Also, according to the invention, a steering wheel pad attachment structure includes an air bag holder, which includes a main body having an air bag attached thereto, and side walls extending substantially perpendicularly from around the main body. The air bag holder is secured at at least one portion thereof to a steering wheel. The steering wheel pad includes a pad main body covering the air bag holder, and pad side walls extending from the pad main body toward the bag holder. The pad side walls are located outside of the side walls of the air bag holder and are engagable with the side walls. The side walls of the air bag holder are provided with claws which extend toward the pad side walls. The claws engage holes formed in the pad side walls. The distal end portions of the claws which project through the pad side walls are bent and crimped in the direction in which the pad side walls extend away from the pad main body.

DESCRIPTION OF PREFERRED EMBODIMENTS

A first embodiment of the present invention will now be described with reference to FIGS. 1 to 4.

Figure 1:
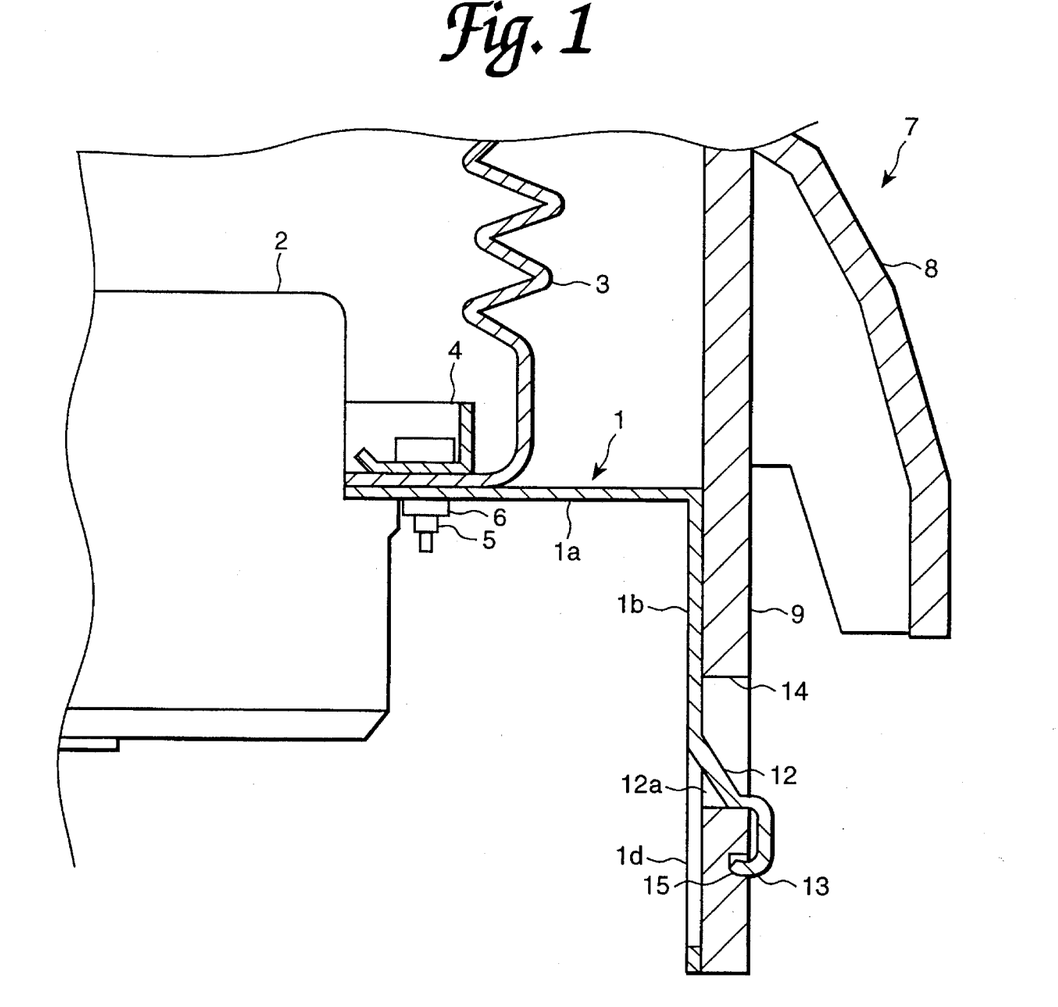
FIG. 1 is a partial cross-sectional view showing an attachment structure of a steering wheel pad according to a first embodiment of the present invention.
Figure 2:
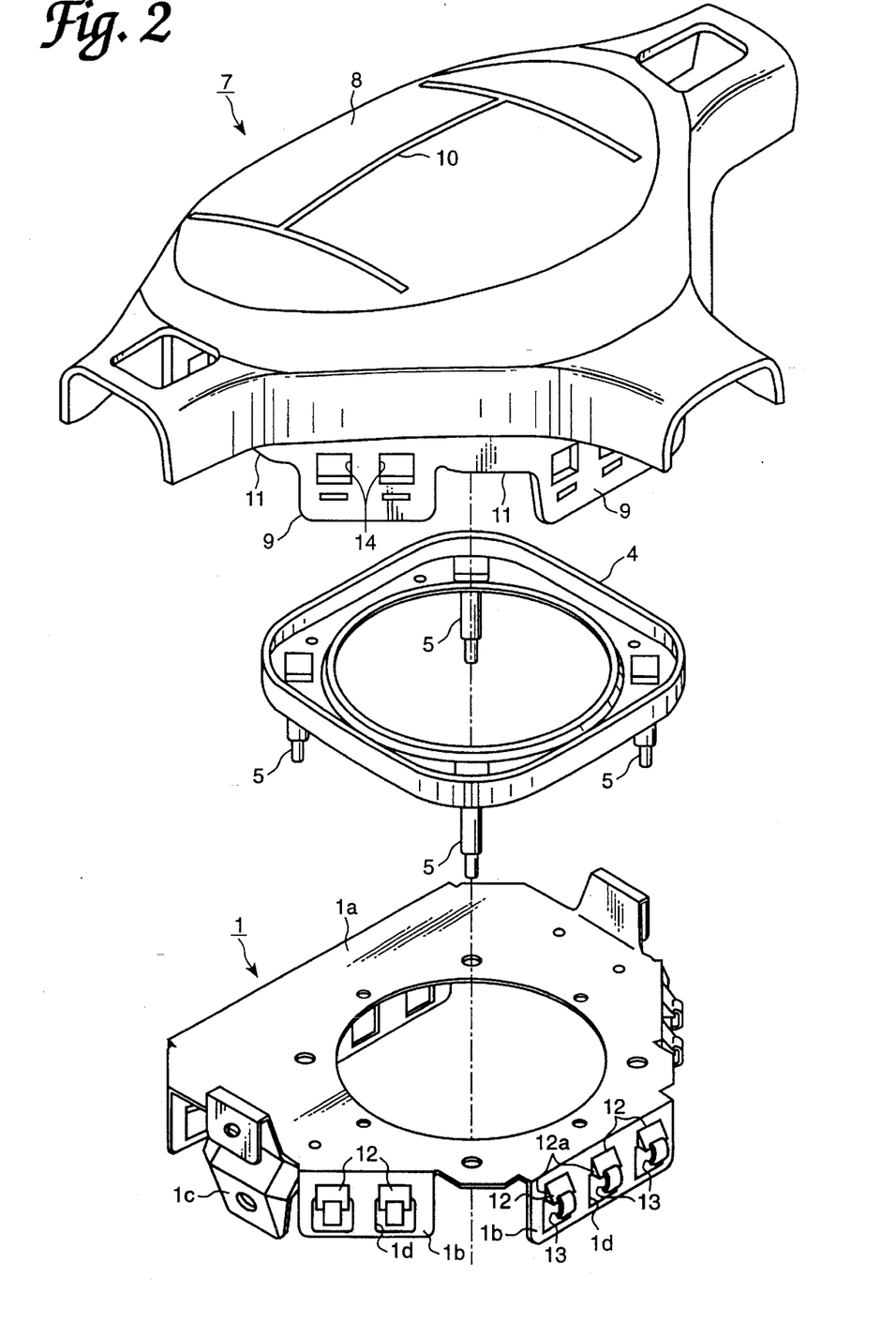
FIG. 2 is an exploded perspective view showing the attachment structure of the pad in the first embodiment.

As shown in FIGS. 1 and 2, an air bag holder 1 comprises a main body 1a having a central opening formed in the center, and side walls 1b extending downwardly, as viewed in the figures. As a whole, the bag holder 1 has, for example, a box-like shape. The air bag holder 1 has fastening portions 1c (see FIG. 2) where the air bag holder 1 is secured on bosses of a steering wheel (not shown). An inflator 2 (see FIG. 1) which contains a gas producing agent is provided in the above-mentioned central opening of the air bag holder 1. Also, an air bag 3 made of cloth (see FIG. 1) and a ring retainer 4 are attached to the upper surface of the air bag holder 1. More specifically, the ring retainer 4 is integrally formed with a plurality of studs 5 projecting downwardly. The studs 5 are inserted in holes of the air bag 3 and the air bag holder 1, and nuts 6 are fastened on threaded portions of the studs 5 which project downwardly from the lower side of the bag holder 1. Thus, the air bag 3 and the ring retainer 4 are fixed on the air bag holder 1. Further, a steering wheel pad 7 (hereinafter referred to simply as "pad") is provided over the bag holder 1. The pad 7 is made of a thermoplastic elastomer, for example, and comprises a pad main body 8, which covers the upper side of the bag holder 1, and pad side walls 9 which extend substantially perpendicularly (downwardly, as viewed in the figures) from the pad main body 8, in the vicinity of the end edge thereof, toward the bag holder 1. A flat H-shape, for example, groove 10 is formed in the pad main body 8 so as to facilitate the opening of the pad 7 when the air bag 3 is inflated. In this embodiment, cut-out portions 11 are formed at least at the corners between the neighboring pad side walls 9. Therefore, the pad side walls 9 can bend relatively easily. Consequently, the pad 7 can be fitted on the bag holder relatively easily. However, such cut-out portions 11 may be omitted.

When a predetermined impact or the like occurs, a large amount of gas is generated by the inflator 2, thereby inflating the air bag 3. Due to this inflation, the pad main body 8 cracks or tears along the above-mentioned groove 10. The pad 7 is therefore expanded and opened so that the inflated air bag 3 is interposed between the driver and the steering wheel.

Next, a pad attachment structure in this embodiment will be described in detail.

Each of the side walls 1b of the air bag holder 1 is provided with a plurality of claws 12 which extend toward the pad side wall 9 (laterally) and downwardly so as to ensure the attachment of the pad 7 to the air bag holder 1. These claws 12 are formed by cutting parts of the side wall 1b to form openings 1d and stamping the side wall 1b. As a result, continuous and laterally protruding wall portions 12a connected to the side wall 1b are formed on the widthwise ends of a proximal portion of each of the claws 12.

Figure 6:
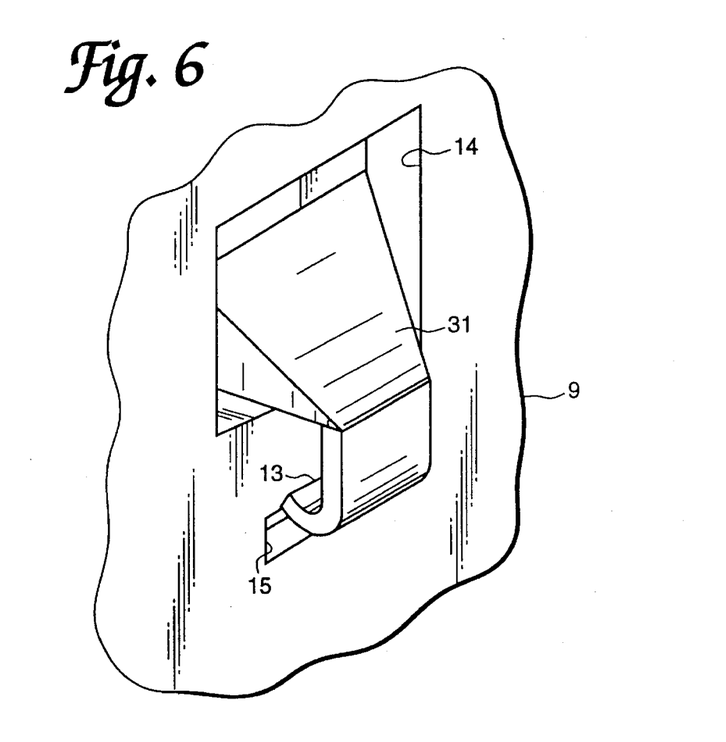
FIG. 6 is a partial enlarged perspective view showing a claw in a modified embodiment.

In this embodiment, a stamped portion of each claw 12 has a U-shape in cross section. However, as shown in FIG. 6, a stamped portion of each claw 31 may be trapezoidal in cross section or may have any other shape. Also, the stamped portion may have a curved shape. In other words, basically, the shape is not particularly restricted so long as the distal end of the claw has an engaging projection and can dissipate outward and lateral stresses on the associated pad side walls 9.

Moreover, the distal end of each of these claws 12 is smaller in width than the proximal end, and is integrally formed with an engaging projection 13 which projects inwardly at an end thereof. On the other hand, holes 14 are formed in the pad side walls 9 at positions corresponding to the claws 12. With the above-described structure, the claws can be received in the holes relatively easily. The holes 14 are opened in a direction perpendicular to the pad side walls 9. However, the holes 14 may have a so-called taper shape such that their opening directions are obliquely inclined downwardly toward the outside. With such a structure, the claws 12 can be smoothly moved into the holes 14, thereby facilitating the pad attachment.

Furthermore, engaging recesses 15 are formed in the outer surface of the pad side walls 9 below the holes 14. The engaging recesses 15 may be engaging apertures (i.e. openings) instead.

Figure 3:
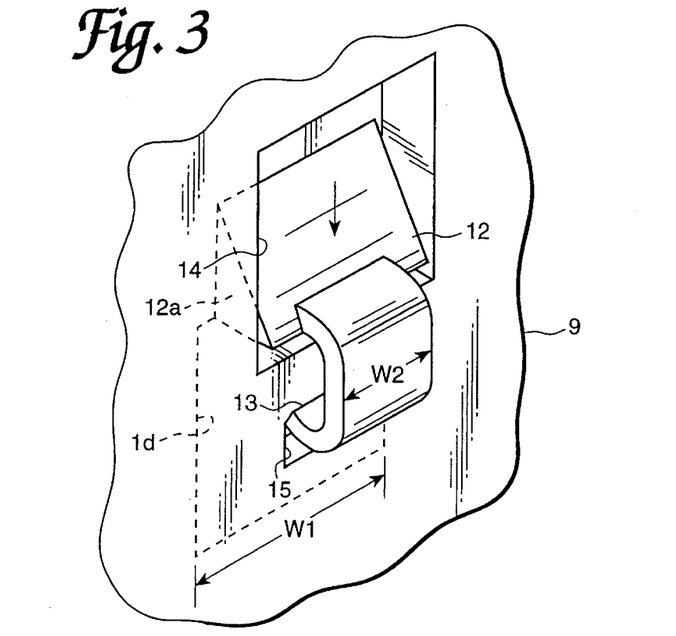
FIG. 3 is a partial enlarged perspective view showing a claw in the first embodiment.

Besides, as shown in FIG. 3, in this embodiment, a width W1 of the openings 1d located below the claws 12 is larger than a width W2 of the engaging projections 13 on the distal ends of the claws 12.

In this embodiment, the pad attachment is effected in such a manner that the pad side walls 9 are located outside of the side walls 1b of the bag holder 1. More specifically, the pad 7 is fitted over the bag holder 1 from above. At this time, the pad side walls 9 can bend or flex relatively easily because the cut-out portions 11 (see FIG. 2) are formed on the corner portions of the pad side walls 9. Then, the positions of the claws 12 are aligned with those of the holes 14.

Subsequently, as shown in FIG. 3, the claws 12 are fitted through the holes 14. At this time, since the distal ends of these claws 12 are relatively small in width, they can be received in the holes 14 relatively easily. Then, the distal ends of the claws 12 project downwardly from the pad side walls 9. Thereafter, the distal ends of the claws 12 are moved toward the engaging recesses 15, and in due course the engaging projections 13 are engaged in the engaging recesses 15. At this time, owing to the existence of the engaging projections 13, the claws 12 are undercut with respect to the pad side walls 9. However, because the width W1 of the openings 1d in the side walls 1b located inside is larger than the width W2 of the engaging projections 13, the portions of the pad side walls 9 which are adjacent to the engaging recesses 15 can be readily flexed so that the engaging projections 13 can be moved into the engaging recesses 15 easily. When such an engagement is completed, the pad 7 is securely fixed on the bag holder 1. At this time, the proximal portions of the claws 12 are substantially received in the holes 14. More specifically, the pad 7 is retained by the proximal portions of the claws 12 including the lower surfaces of the continuous wall portions 12a and the roots of the engaging projections 13.

With the above-described attachment structure, the pad 7 can be securely fixed to the bag holder 1 even without additional members such as the rivets and the support plates described with respect to the prior art. Moreover, the claws 12 can be obtained by cutting portions of the side walls 1b and stamping them. As a result, separate parts need not be employed for attachment of the pad 7, thereby avoiding cost increases due to the use of separate parts.

Figure 4:
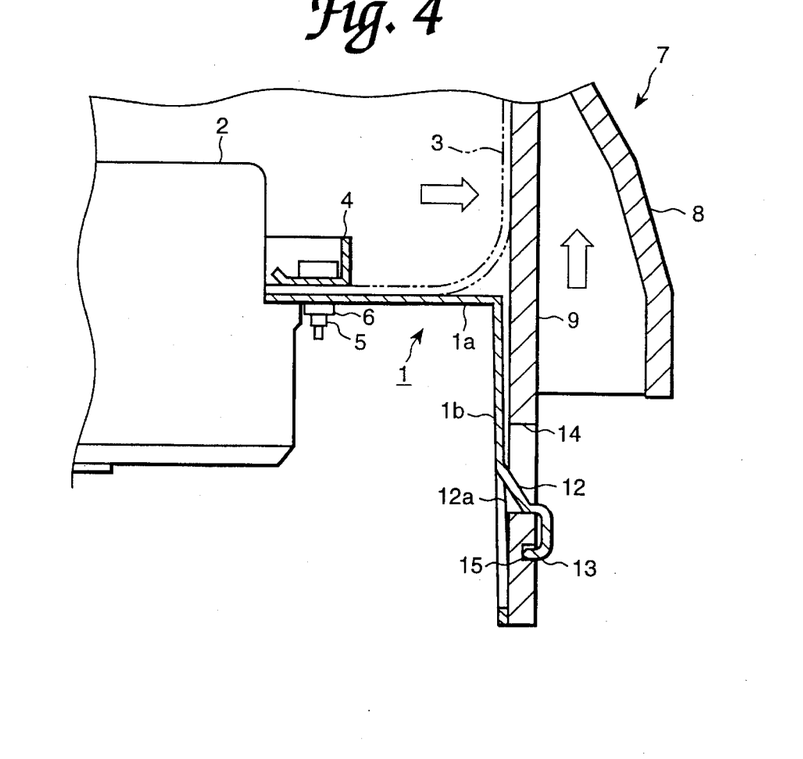
FIG. 4 is a partial cross-sectional view showing an action when an air bag is inflated in the first embodiment.

When the air bag 3 is inflated, outward and lateral stresses are exerted on the pad 7, as shown by the arrows in FIG. 4. The upward stresses can be dissipated when the claws 12 having a predetermined width abut against the hole portions 14 and the engaging projections 13 are engaged in the engaging recesses or apertures 15. Especially because the claws 12 are formed by stamping and connected to the side walls 1b through the continuous wall portions 12a, deformation strength of the claws 12 is increased. Also, the pad 7 is retained by the lower surfaces of the continuous wall portions 12a and the roots of the engaging projections 13 in a direction, in which the pad 7 comes out, and is thus prevented from coming off, so as to ensure stability of the pad attachment.

Even if the outward stresses are applied, the pad 7 is retained by the contact surfaces of the side walls 1b of the bag holder 1 and the contact surfaces of the engaging projections 13 on the distal ends of the claws 12 because the distal end portions of the claws 12 extend downwardly, as viewed in the figures. Therefore, even if stresses caused by inflation of the air bag 3 are applied to the pad 7, the pad side walls 9 can be kept stable, and the claws 12 are unlikely to come off. Consequently, it is possible to prevent the pad 7 from disengaging from the bag holder 1 when the air bag 3 is inflated.

A second embodiment of the present invention will now be described with reference to FIG. 5. The basic structure of this embodiment is the same as the above-described first embodiment. Therefore, the same component parts are denoted by the same reference numerals, and their explanations will be omitted. Differences between the first embodiment and the second embodiment will be described below.

Figure 5:
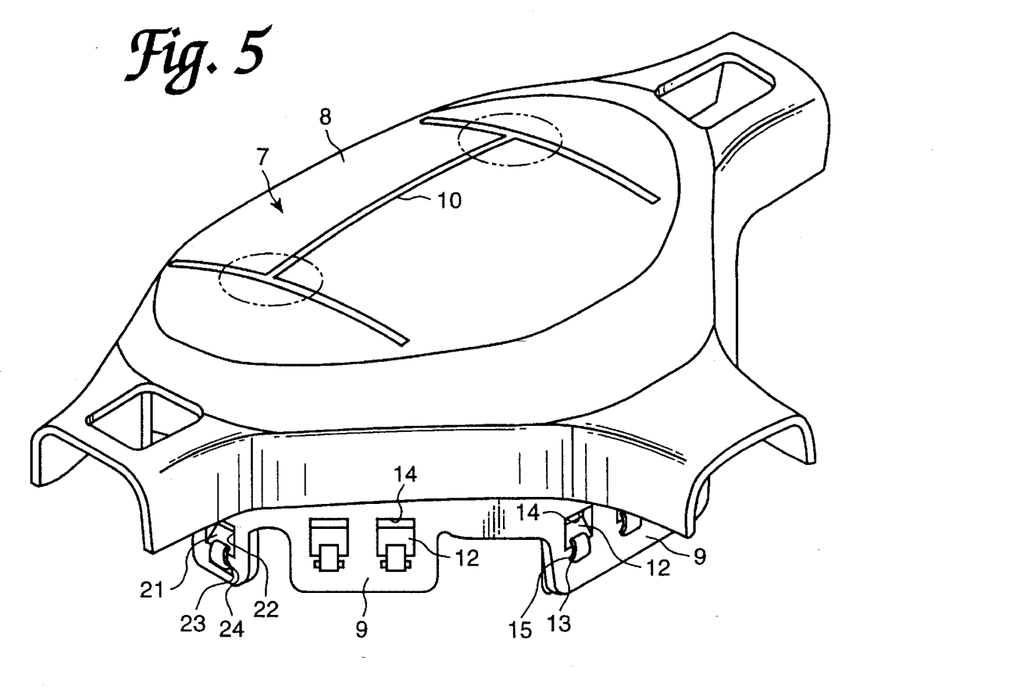
FIG. 5 is a perspective view showing a pad attachment structure according to a second embodiment of the invention.

As shown in FIG. 5, this embodiment is different from the first embodiment in that attachment is also effected by claws 21 located in the vicinity of those portions of flat H-shaped groove 10 formed in pad main body 8 where rupture starts when an air bag 3 is inflated (those portions of FIG. 5 which are circled by a double-dashed line). More specifically, claws 21, similar to claws 12, are formed on side walls 1b of a bag holder 1 by cutting and stamping, and are fitted in corresponding holes 22 formed in pad side walls 9. Also, engaging projections 23 on the distal ends of claws 21 which project through holes 22 in the pad side walls 9 are engaged in engaging recesses 24 located below the holes 22.

With the structure of the second embodiment, the following function and effect can be realized, in addition to those described in the first embodiment. When the air bag 3 is inflated, pad 7 primarily experiences upward stresses, as viewed in the figure. At this time, the pad side walls 9 neighboring those portions where the rupture starts are securely fixed by way of the claws 21, the engaging projections 23, and so forth. Consequently, expansion of the pad main body 8 at the time of inflation of air bag 3 is reduced to a minimum so that the pad 7 is split along the groove 10 more smoothly and more quickly. As a result, it is possible to shorten the time elapsed after gas generation from an inflator 2 and before the pad 7 is expanded, to permit the air bag 3 to completely expand.

Figure 7:
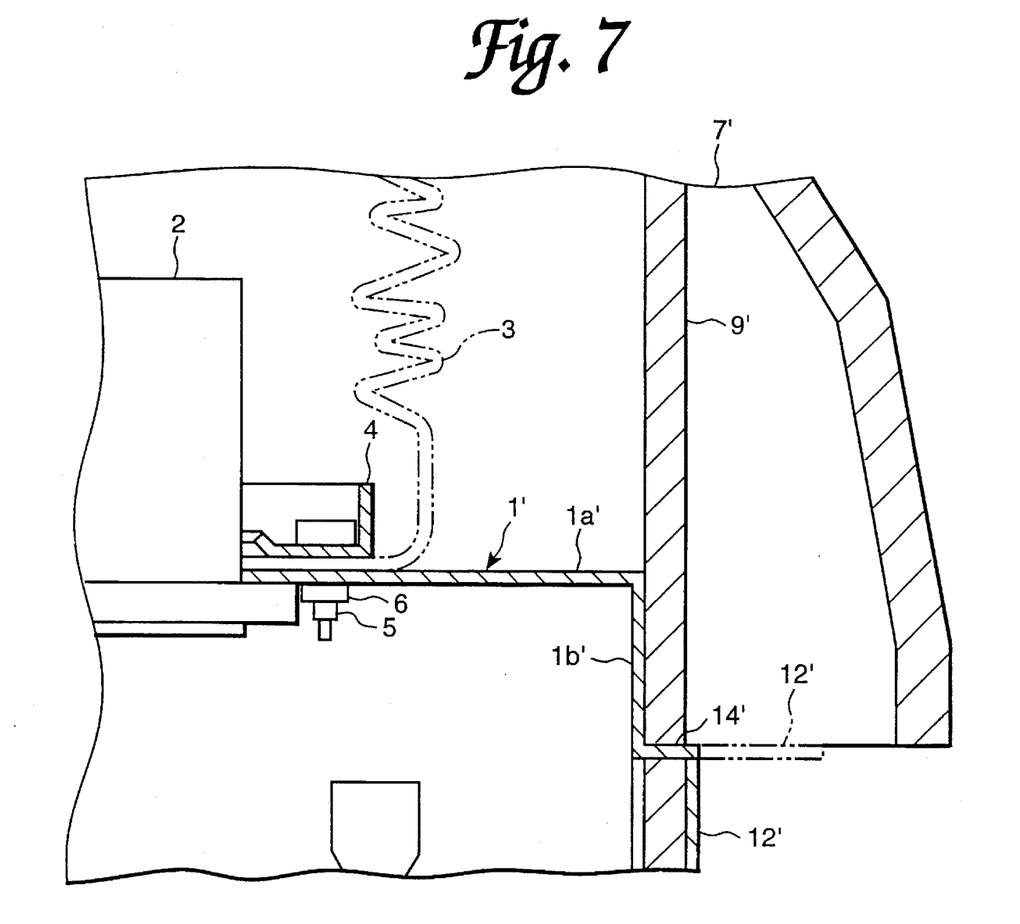
FIG. 7 is a partial cross-sectional view showing a pad attachment structure of a pad according to a third embodiment of the invention.
Figure 8:
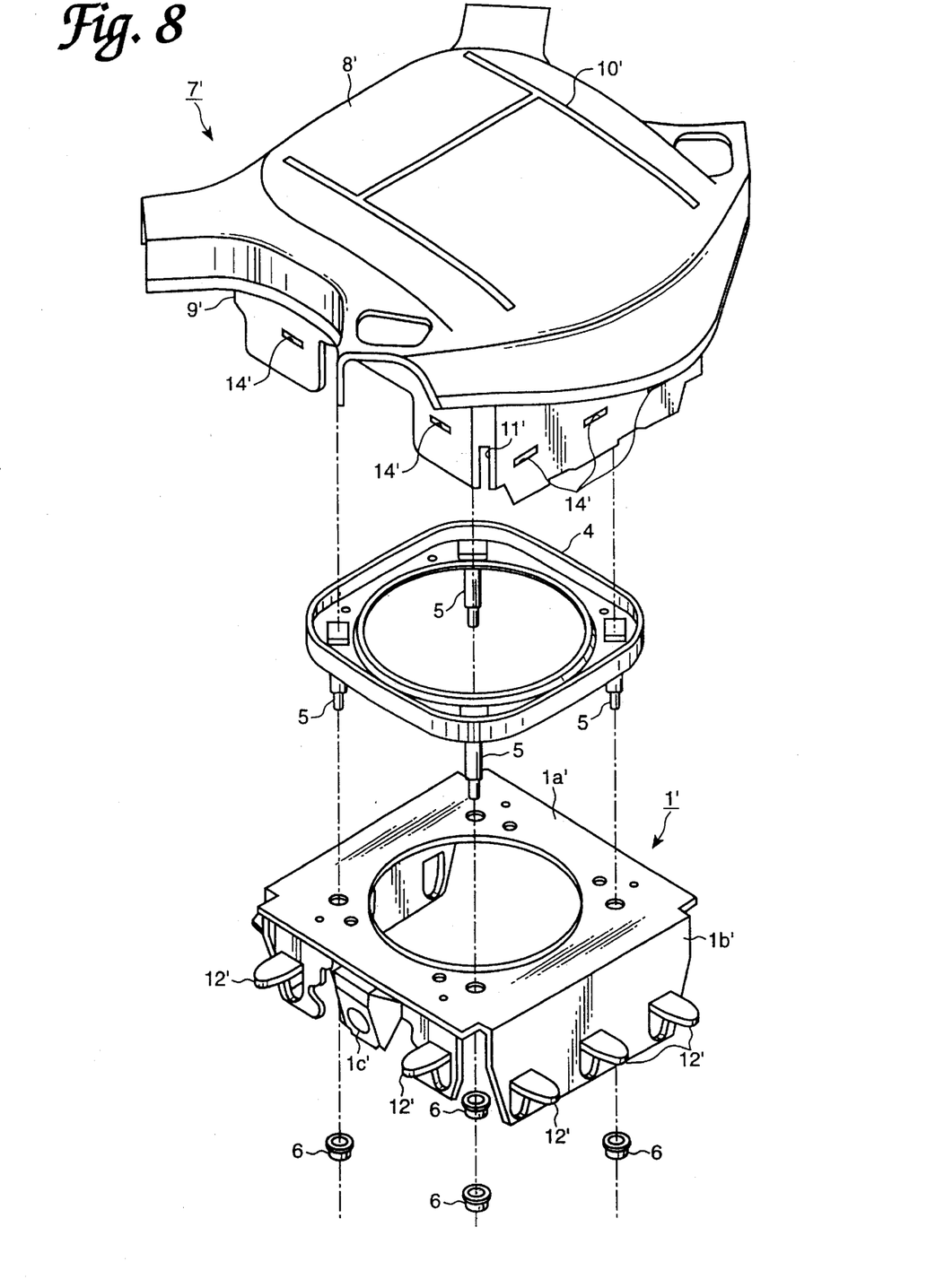
FIG. 8 is an exploded perspective view showing the pad attachment structure in the third embodiment.

Next, a third embodiment of the invention will be described with reference to FIGS. 7 and 8. The basic structure of this embodiment is the same as the above-described first embodiment. Therefore, similar component parts are denoted by the same reference numerals with primes. Thus, explanation of these parts will be omitted, and differences between the third embodiment and the first embodiment will be described below.

Each side wall 1b' of a bag holder 1' is cut to form a plurality of claws 12' which extend toward a pad side wall 9' (radially outwardly). These claws 12' have a smaller width toward their distal ends. The shape of the claws is not particularly restricted so long as the claws have a predetermined width which can dissipate upward stresses on pad side walls 9'.

A plurality of holes 14' having a shape corresponding to a cross-sectional shape of the claws 12' are formed in the pad side walls 9' at positions corresponding to the claws 12'.

In this embodiment, pad attachment is accomplished in such a manner that the pad side walls 9' are located outside of the side walls 1b' of the bag holder 1'. More specifically, the pad 7' is fitted over the bag holder 1' from above. At this time, the pad side walls 9' can be bent relatively easily because cut-out portions 11' are formed on corner portions of the pad side walls 9'. Then, the positions of the claws 12' are aligned with those of the holes 14'. However, such cut-out portions 11' may be omitted.

Subsequently, as shown by a chain double-dashed line in FIG. 7, the claws 12' are fitted in the holes 14'. At this time, since the distal ends of these claws 12' are smaller in width than the proximal ends, they can be fitted in the holes 14' relatively easily. Thereafter, the distal end portions of the claws 12' which project from the pad side walls 9' are bent in the direction in which the side walls 1b' extend (downwardly, as viewed in the figure), and are crimped. Then, as shown by a solid line in FIG. 7, the pad side walls 9' are held in a hooked manner by the side walls 1b' of the bag holder 1' and the claws 12', thereby securely fixing the pad 7' on the bag holder 1'.

With the above-described attachment structure, the pad 7' can be securely fixed on the bag holder 1' without using additional members such as the rivets and the support plates described with respect to the prior art. Moreover, the claws 12' can be obtained by simply cutting portions of the side walls 1b'. As a result, separate parts need not be employed for attaching pad 7', thus avoiding an increase in costs due to use of additional parts.

Figure 9:
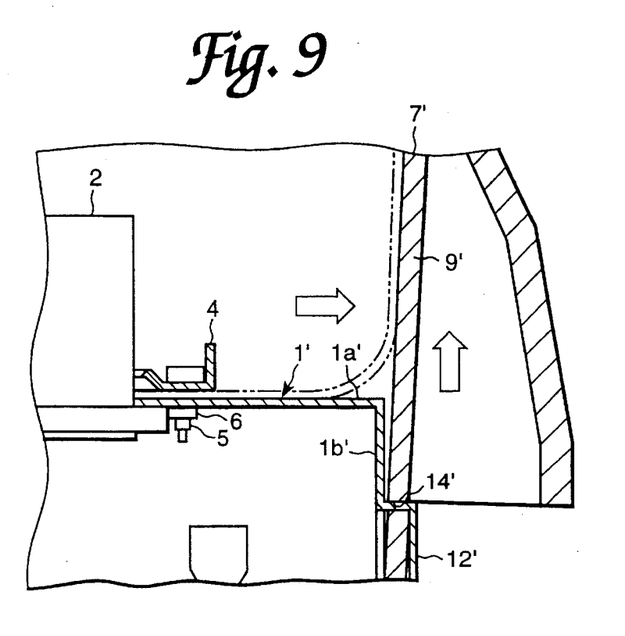
FIG. 9 is a partial cross-sectional view showing an action when an air bag is inflated in the third embodiment.

When the air bag 3 is inflated, outward and lateral stresses are exerted on the pad 7', as shown by the arrows in FIG. 9. The outward stresses can be dissipated by claws 12' having predetermined widths. Even if lateral stress is exerted, the pad 7' is retained by the contact surfaces of the side walls 1b' of the bag holder 1' and the contact surfaces of the claws 12' because the distal end portions of the claws 12' are bent downwardly, as viewed in the figure. Therefore, even if stress, caused by the inflation of the air bag 3, is exerted on the pad 7', the pad side walls 9' can be kept stable, and claws 12' are unlikely to be disengaged. In consequence, it is possible to prevent the pad 7' from being detached from the bag holder 1' when the air bag 3 is inflated.

A fourth embodiment of the invention will now be described with reference to FIGS. 10 and 11. The basic structure of this embodiment is the same as the above-described third embodiment. Therefore, common component parts are denoted by the same reference numerals so that explanations thereof will be omitted. Differences between the third and fourth embodiments will be mainly described below.

Figure 10:
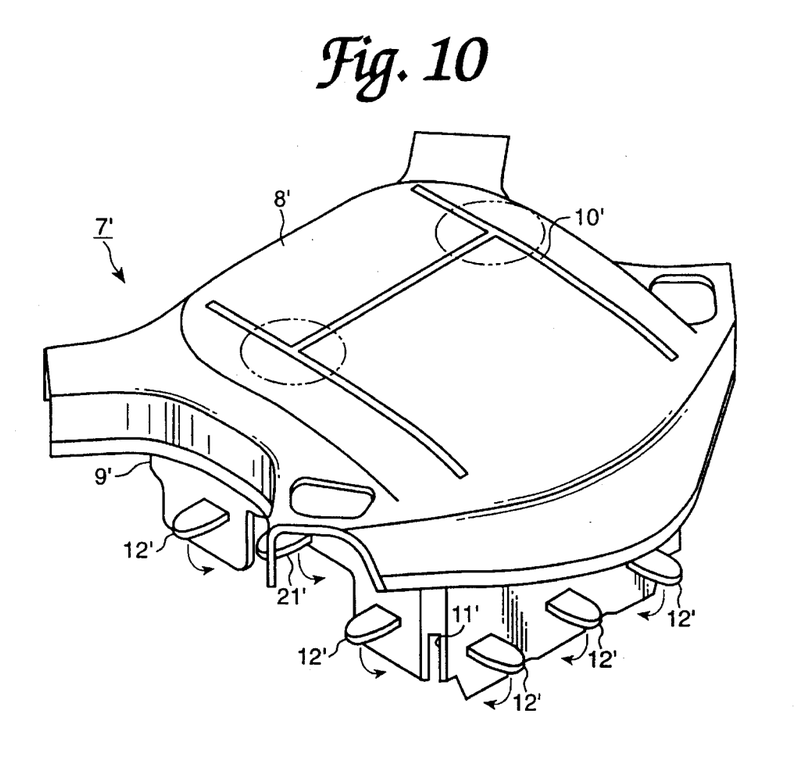
FIG. 10 is a perspective view showing a pad attachment structure according to a fourth embodiment of the invention.
Figure 11:
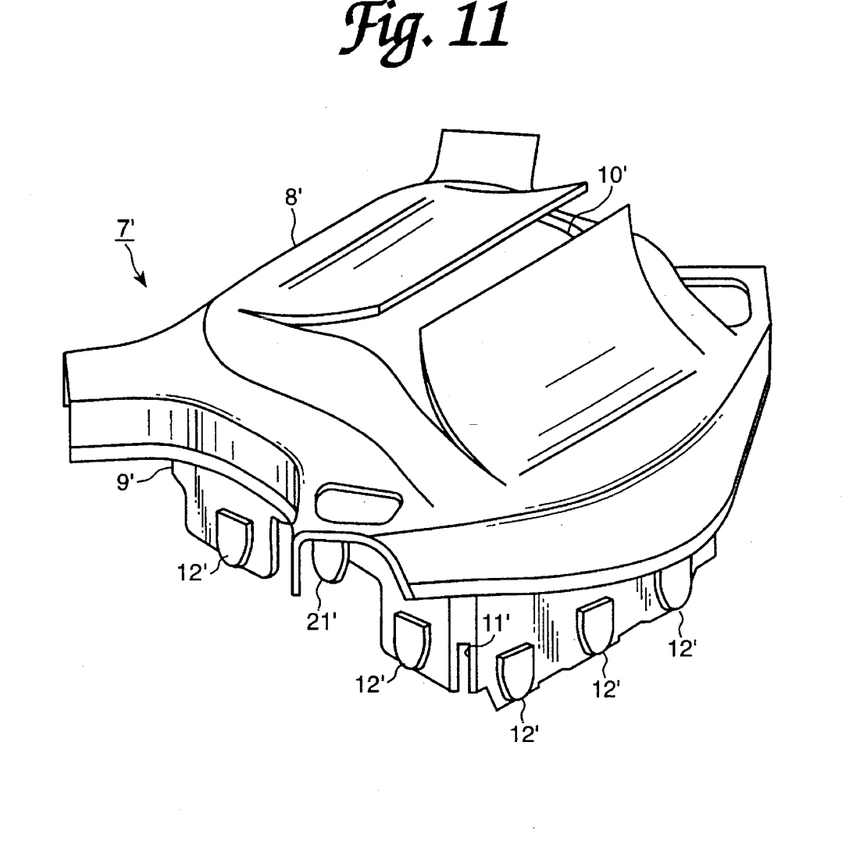
FIG. 11 is a perspective view showing an action when an air bag is inflated in the fourth embodiment.

As shown in FIG. 10, this embodiment is different from the third embodiment in that claws 21' are provided adjacent to those portions of H-shaped groove 10' in the pad main body 8' where rupture starts when an air bag 3 is inflated (circled portions of FIG. 10). More specifically, claws 21', which are similar to claws 12', are formed by cutting side walls 1b' of air bag holder 1', and are fitted in holes formed in pad side walls 9'. The distal end portions of the claws 21' which project from the pad side walls 9' are bent downwardly, as viewed in the figure, and caulked.

With the structure of the fourth embodiment, the following function and effect can be realized, in addition to those described with respect to the third embodiment. Referring to FIG. 11, when the air bag 3 is inflated, pad 7' primarily experiences upward stresses, as viewed in the figure. At this time, the pad side walls 9', neighboring those portions where the rupture of pad main body 8' starts, are securely fixed by claws 21'. Consequently, expansion of the pad main body 8' accompanied by inflation of the air bag 3 is reduced to a minimum so that the pad 7' opens along the groove 10' more smoothly and more quickly. As a result, it is possible to achieve shortening of time elapsed after gas generation from an inflator 2 and before the pad 7' is expanded to permit the air bag 3 to completely expand.

What is claimed is:

1. An air bag safety device comprising:

an air bag holder including a main body having a peripheral portion, and a side wall extending from said main body adjacent to said peripheral portion;

an air bag fixedly attached to said air bag holder; and a cover pad covering at least a portion of said air bag and said air bag holder, said cover pad including a pad main body and a pad side wall extending from said pad main body toward said side wall of said air bag holder, said pad side wall having inward and outward faces;

wherein said side wall of said air bag holder includes at least one outwardly extending claw portion, wherein said at least one claw portion has an engaging projection provided on a distal end thereof, said side wall of said air bag holder further including an opening immediately adjacent to said at least one claw portion, wherein said opening in said side wall is wider than said engaging projection of said at least one claw portion;

wherein at least one hole is formed in said pad side wall in a position corresponding to said at least one claw portion, said pad side wall being provided with an engaging depression on said outward face of said pad side wall adjacent to said at least one hole formed in said pad side wall;

wherein said at least one claw portion is insertingly engaged with a respective said hole formed in said pad side wall and said engaging projection provided on said at least one claw portion is engaged with said engaging depression.

2. An air bag safety device as claimed in claim 1, wherein cut out portions are provided in said pad side wall.

3. An air bag safety device as claimed in claim 1, wherein said at least one claw portion is integral with said side wall of said air bag holder.

4. An air bag safety device as claimed in claim 1, wherein said pad main body is adapted to selectively rupture when said air bag is inflated.

5. An air bag safety device as claimed in claim 4, further including, adjacent to a portion of said pad main body which initially ruptures when said air bag is inflated, a claw portion on said air bag holder side wall and a corresponding hole and engaging depression provided in said pad side wall.

* * * * *